United States Patent [19]

Hara

[11] Patent Number: 4,917,206

[45] Date of Patent: Apr. 17, 1990

[54] APPARATUS FOR AUTOMOTIVE VEHICLE SPEED CONTROL

[75] Inventor: Toshiaki Hara, Zama, Japan

[73] Assignee: Nissan Motor Company, Limited, Yokohama, Japan

[21] Appl. No.: 948,168

[22] Filed: Dec. 31, 1986

[30] Foreign Application Priority Data

Jan. 10, 1986 [JP] Japan .................................. 61-2231

[51] Int. Cl.[4] .............................................. B60K 31/04
[52] U.S. Cl. .................................... 180/179; 180/176; 364/426.04
[58] Field of Search ............... 180/170, 174, 175, 176, 180/177, 178, 179; 364/426.04, 426.05; 123/350

[56] References Cited

U.S. PATENT DOCUMENTS

| | | | |
|---|---|---|---|
| 3,766,367 | 10/1973 | Sumiyoshi et al. | 180/176 X |
| 4,394,739 | 7/1983 | Suzuki et al. | 180/176 X |
| 4,479,184 | 10/1984 | Nakano | 123/350 X |
| 4,520,778 | 6/1985 | Nanjo et al. | 180/179 X |
| 4,560,024 | 12/1985 | Noda et al. | 180/176 |

FOREIGN PATENT DOCUMENTS 59-58134 4/1984 Japan .

Primary Examiner—Charles A. Marmor
Assistant Examiner—Brian Johnson
Attorney, Agent, or Firm—Pennie & Edmonds

[57] ABSTRACT

An apparatus for controlling a throttle valve to retain the speed of running of an automotive vehicle within an insensible range having a predetermined width defined by upper and lower limits. The apparatus includes a first sensor sensitive to vehicle speed for providing a vehicle speed signal indicative of the sensed speed of running of the vehicle and a second sensor sensitive to throttle valve position for providing a throttle-valve position signal indicative of the sensed position of the throttle valve. The apparatus also includes a control circuit coupled to the first and second sensors for increasing a predetermined degree and narrowing the predetermined width of therefor the insensible range in response to the vehicle speed signal having a period within a predetermined range and a peak-to-peak value greater than a predetermined value and the throttle-valve position signal having a period within a predetermined range and a peak-to-peak value greater than a predetermined value. The control circuit moves the throttle valve the predetermined degree in a closing direction in response to the sensed vehicle speed greater than the upper limit and moves the throttle valve the predetermined degree in an opening direction in response to the sensed vehicle speed less than the lower limit.

6 Claims, 3 Drawing Sheets

4,917,206

APPARATUS FOR AUTOMOTIVE VEHICLE SPEED CONTROL

BACKGROUND OF THE INVENTION

This invention relates to an apparatus for controlling a throttle valve position to retain the speed of running of an automotive vehicle within a range having a predetermined width.

Automotive vehicle speed control apparatus have been employed in some types of automotive vehicle for providing automatic control of the vehicle speed at a target value by adjusting the engine carburetor throttle valve in a direction which eliminates any deviation of the acutal vehicle speed value from the target value. Under such vehicle speed control, it is not necessary for the driver to continually depress the accelerator pedal when the automotive vehicle is intended to run at a constant speed on an express highway. One example of such automotive vehicle speed control apparatus is disclosed in Japanese Patent Kokai No. 59-58134.

In the conventional vehicle speed control apparatus, the throttle valve position is changed in an amount proportional to the deviation of the acutal vehicle speed value from the target value if the deviation moves out of an insensible range within which the passenger is insensible to any vehicle speed change. The required throttle valve position change should also be proportional to the target value since the response to changes in vehicle speed is slower to a change in throttle valve position at a higher vehicle speed. In addition, the response time of the change in vehicle speed to a throttle valve position change tends to vary with variations in engine performance, aerodynamic efficiency, throttle valve position, and other characteristics. In order to provide good vehicle constant-speed control, therefore, it is required to overcome this tendency by calculating the insensible range and the required throttle-valve position change using different proportional constants for different automotive vehicles.

In addition, the conventional vehicle speed control apparatus tend to create a hunting problem which results in repeated vehicle speed changes at short intervals for automotive vehicles having such a characteristic that the vehicle speed changes in slow response to a change in the position of the throttle valve and a surge problem which results in vehicle acceleration changes repeated at short intervals for automotive vehicles having such a characteristic that the vehicle speed changes in extremely fast response to a change in the position of the throttle valve.

SUMMARY OF THE INVENTION

A main object of the invention is to provide a vehicle speed control apparatus which can provide good vehicle constant-speed control free from hunting and/or surge which may occur when the automotive vehicle is running on an uphill or downhill road.

It is another object of the invention to provide a vehicle speed control apparatus which is equally applicable without any modification to various types of automotive vehicle different in response speed, engine performance, aerodynamic efficiency, and other characteristics.

There is provided, in accordance with the invention, an apparatus for controlling a throttle valve to retain the speed of running of an automotive vehicle within a range having a predetermined width defined by upper and lower limits. The apparatus includes sensor means sensitive to vehicle speed for providing a vehicle speed signal indicative of the sensed speed of running of the vehicle and sensitive to throttle valve position for providing a throttle-valve position signal indicative of the sensed position of the throttle valve. The apparatus also includes a control circuit coupled to the sensor means for increasing a predetermined degree and narrowing the predetermined width of the insensible range in response to the vehicle speed signal having a period within a predetermined range and a peak-to-peak value greater than a predetermined value and the throttle-valve position signal having a period within a predetermined range and a peak-to-peak value greater than a predetermined value. The control circuit includes means for moving the throttle valve the predetermined degree in a closing direction in response to the sensed vehicle speed greater than the upper limit and for moving the throttle valve the predetermined degree in an opening direction in response to the sensed vehicle speed less than the lower limit.

In another aspect of the invention, there is provided an apparatus for controlling a throttle valve to retain the speed of running of an automotive vehicle within a range having a predetermined width defined by upper and lower limits. The apparatus includes sensor means sensitive to vehicle speed for providing a vehicle speed signal indicative of the sensed speed of running of the vehicle and sensitive to throttle valve position for providing a throttle-valve position signal indicative of the sensed position of the throttle valve. The apparatus also includes a control circuit coupled to the sensor means for decreasing a predetermined degree and widening the predetermined width of the insensible range in response to throttle-valve position signal less than a predetermined value and a peak-to-peak value greater than a predetermined value. The control circuit includes means coupled to the sensor means for moving the throttle valve the predetermined degree in a closing direction in response to the sensed vehicle speed greater than the upper limit and for moving the throttle valve the predetermined degree in response to the sensed vehicle speed less than the lower limit.

BRIEF DESCRIPTION OF THE INVENTION

Other objects, features and advantages of the invention will be readily apparent from the following description of certain preferred embodiments thereof, taken in conjunction with the accompanying drawings although variations and modifications may be effected without departing from the scope of the novel concepts embodied in the disclosure, and in which.

DETAILED DESCRIPTION OF THE INVENTION

Figure 1:
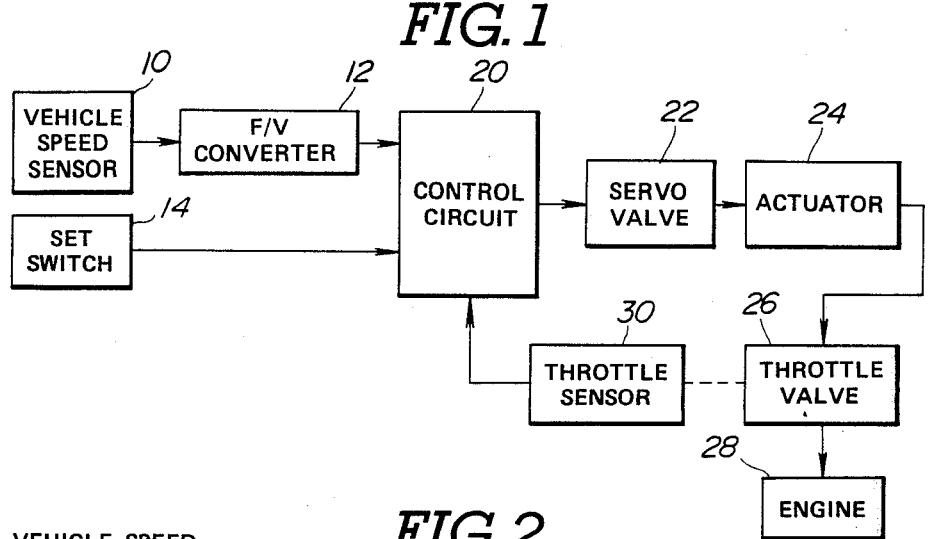
FIG. 1 is a block diagram showing one embodiment of an automotive vehicle speed control apparatus made in accordance with the invention.

With reference to the drawings and in particular to FIG. 1, there is shown a schematic block diagram of an automotive vehicle speed control system embodying the present invention. The vehicle speed control apparatus includes a vehicle speed sensor 10 for producing an electrical signal at a frequency corresponding to the speed of running of the automotive vehicle. For example, the vehicle speed sensor 10 may comprise a lead switch positioned near a magnet coupled to a vehicle component for closing at the same frequency as the frequency of rotation of the magnet. The sensor signal is fed from the vehicle speed sensor 10 to a frequency-to-voltage converter 12 which converts it into a vehicle speed signal having a magnitude corresponding to the frequency of the received signal and thus to the speed of running of the automotive vehicle. The vehicle speed signal is applied to a control circuit 20.

A variable positionable throttle valve 26, mounted for rotation with a throttle shaft, is situated within an engine caburetor induction passage (not shown) and effective controlling the flow of air to an internal combustion engine 28. A throttle valve actuator 24 has a shaft which is drivingly coupled to the throttle shaft. The throttle valve actuator 24 functions to vary the position of the throttle valve 26 in a manner as described later. The throttle valve actuator 24 is electrically controlled and it determines the setting of the throttle valve 26 which, in turn, determines the amount of air admitted to the engine. A throttle valve position sensor 30 is provided for generating a throttle-valve position signal indicative of the degree of opening of the throttle valve 26. The throttle valve position sensor 30 may include a potentiometer having a wiper arm operatively connected to the throttle valve shaft to change the resistance value of the potentiometer as the throttle valve 26 moves. The throttle-valve position signal is applied to the control circuit 20.

The numeral 14 designates a set switch manually operable to produce a control signal so as to place the control circuit 20 into an operation mode adjusting the throttle valve 26 in a manner to retain the vehicle speed within a vehicle speed insensible range around a target value intended through the operation of the set switch 14.

Figure 2:
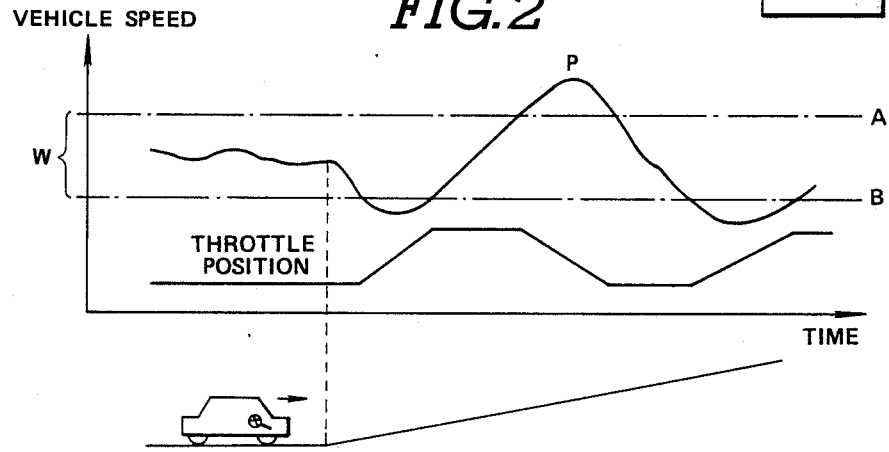
FIG. 2 is a graph used in explaining the hunting problem.

The control circuit 20 is responsive to a control signal fed thereto from the set switch 14 for adjusting the throttle valve position in manner to retain the vehicle speed within an insensible vehicle speed range having a predetermined width "W", as shown in FIG. 2. The predetermined width "W" of the insensible speed range is defined by upper limit A and lower limit B, as shown in FIG. 2, and represents the limits between which the operator of the vehicle is insensible to any change in vehicle speed. The calculable upper and lower limits A and B differ for different automobile vehicles. The width "W" is established around a target value which may be set at a vehicle speed existing when the set switch 14 is turned on or a desired vehicle speed intended by the operator through the operation of the set switch 14. This vehicle speed range as previously explained is defined by upper and lower limits A and B between which the passenger is insensible to any vehicle speed change and has previously been referred to as the insensible range. The control circuit 20 performs such a control by moving the throttle valve 26 a predetermined angle $\Delta\theta$ in a closing direction if the existing vehicle speed is greater than the upper limit A and in a opening direction if the existing vehicle speed is less than the lower limit B.

If the automotive vehicle has such a characteristic that the vehicle speed changes in slow response to a change of position of the throttle valve, this vehicle speed control may create hunting which results in great vehicle speed changes repeated at short time intervals. Such a hunting problem will be described in greater detail with reference to FIG. 2.

The throttle valve position is held constant in order to retain the vehicle speed within the insensible range W when the automotive vehicle is running on a level road. When the automotive vehicle enters an uphill road, the vehicle speed will decrease. When the vehicle speed decreases to the lower limit B, the throttle valve is moved in an opening direction in order to retain the vehicle speed above the lower limit B. However, the vehicle speed cannot increase in fast response to the throttle valve movement and it continues decreasing. After a delay, the vehicle speed starts increasing. When the vehicle speed increases to the lower limit B, the throttle valve is retained at the existing position. However, the vehicle speed continues increasing. When the vehicle speed increases to the upper limit A, the throttle valve is moved in a closing direction in order to retain the vehicle speed below the upper limit A. However, the vehicle speed cannot decrease in fast response to this throttle valve movement and it continues increasing. After a delay, the engine speed starts decreasing. When the vehicle speed decreases to the upper limit A, the throttle valve is held at the existing position. However, the vehicle speed continues decreasing. When the vehicle speed decreases to the lower limit B, the throttle valve is moved in the opening direction in order to retain the vehicle speed above the lower limit B. However, the vehicle speed cannot increase in fast response to this throttle valve movement and it continues decreasing. After a delay, the vehicle speed starts increasing. Such a vehicle speed change is repeated in short time intervals.

The control circuit 20 detects a tendency toward hunting which results in vehicle speed changes repeated at short intervals when the vehicle speed signal has a period within a predetermined range and a peak-to-peak value greater than a predetermined value, and the throttle-valve position signal has a period within a predetermined range and a peak-to-peak value greater than a predetermined value.

Figure 3:
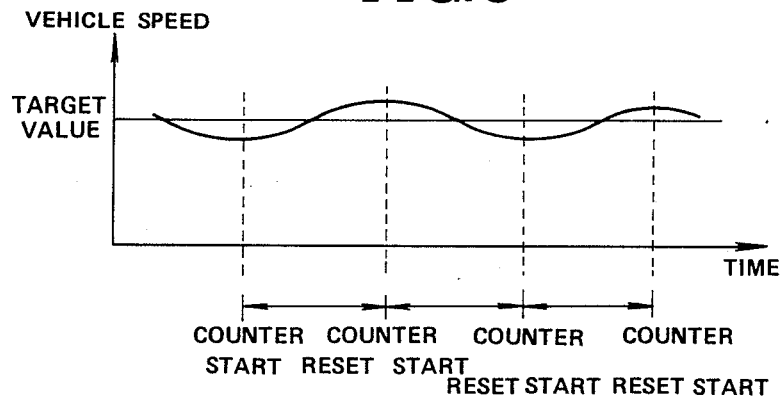
FIG. 3 is a graph used in explaining measurement of the period of the vehicle speed signal.

The control circuit 20 measures the period of the vehicle speed signal. For this purpose, the control circuit 20 includes a first peak detector and a first counter. The measurement will be described with reference to FIG. 3. The first peak detector produces a pulse each time the vehicle speed signal exhibits a peak. This pulse is fed from the first peak detector to reset the first counter and start it counting pulses fed from a pulse generator. Thus, the first counter accumulates a count proportional to half of the period of the vehicle speed signal. The control circuit 20 measures the peak-to-peak value of the vehicle speed signal by calculating a difference between two vehicle speed signal values sampled respectively in response to successive two pulses fed from the first peak detector. The control circuit 20 also measures the period of the throttle-valve position signal in a similar manner. For this purpose, the control circuit 20 includes a second peak detector and a second counter. The second peak detector produces a pulse each time the throttle-valve position signal exhibits a peak. This pulse is fed from the second peak detector to reset the second counter and start it counting pulses fed from the pulse generator. Thus, the first counter accumulates a count proportional to half the period of the throttle-valve position signal. The control circuit 20 measures the peak-to-peak value of the throttle-valve position signal by calculating a difference between two throttle-valve position signal values sampled respectively in response to successive two pulses fed from the second peak detector.

It is to be noted that the period of the vehicle-speed or throttle-valve-position signal may be measured by averaging a predetermined number of values measured for the period. In addition, the period of the vehicle-speed or throttle-valve-position signal may be determined by adding a predetermined number of differences between successive two measured period values and comparing the sum with upper and lower limits defining a predetermined range. If the sum is within the predetermined range, it can be seen that the signal changes at a constant period.

When the control unit 20 detects hunting, it controls the throttle valve position in a direction eliminating the hunting by increasing the predetermined angle $\Delta\theta$ and narrowing the insensible range.

If the automotive vehicle has such a characteristic that the vehicle speed changes in extremely fast response to a change of position of the throttle valve, this vehicle speed control may create surge which results in vehicle acceleration changes repeated at short intervals. Therefore, it is preferable that the control circuit 20 be arranged to detect surge and eliminate the surge. According to the invention, the control circuit 20 detects a tendency toward surge when the throttle-valve position signal has a period less than a predetermined value and a peak-to-peak value greater than a predetermined value. When the control unit 20 detects surge, it controls the throttle valve position in a direction eliminating the surge by decreasing the predetermined angle $\Delta\theta$ and widening the insensible range.

The control circuit 20 may employ a digital computer which shall be regarded as including an analog-to-digital converter, a central processing unit, a memory, a timer, and a logic circuit. The analog-to-digital converter receives the vehicle speed signal fed from the frequency-to-voltage converter 12 and a throttle-valve position signal fed from the throttle valve position sensor 30. The analog-to-digital converter converts the received signals into corresponding digital signals for application to the central processing unit. The central processing unit calculates a required new setting, at a given time, of the throttle valve position. The memory contains the program for operating the central processing unit and further contains appropriate data in look-up tables used in calculating appropriate values corresponding to a setting of the throttle valve position. The actual setting of the throttle valve 26 is accomplished with the servo valve 22 and the throttle actuator 24. The logic circuit interconnects the digital computer central processing unit and its memory with the servo valve 22 which controls the throttle actuator 24 to move the throttle valve 26 so as to retain the vehicle speed within the insensible range.

Figure 4A:
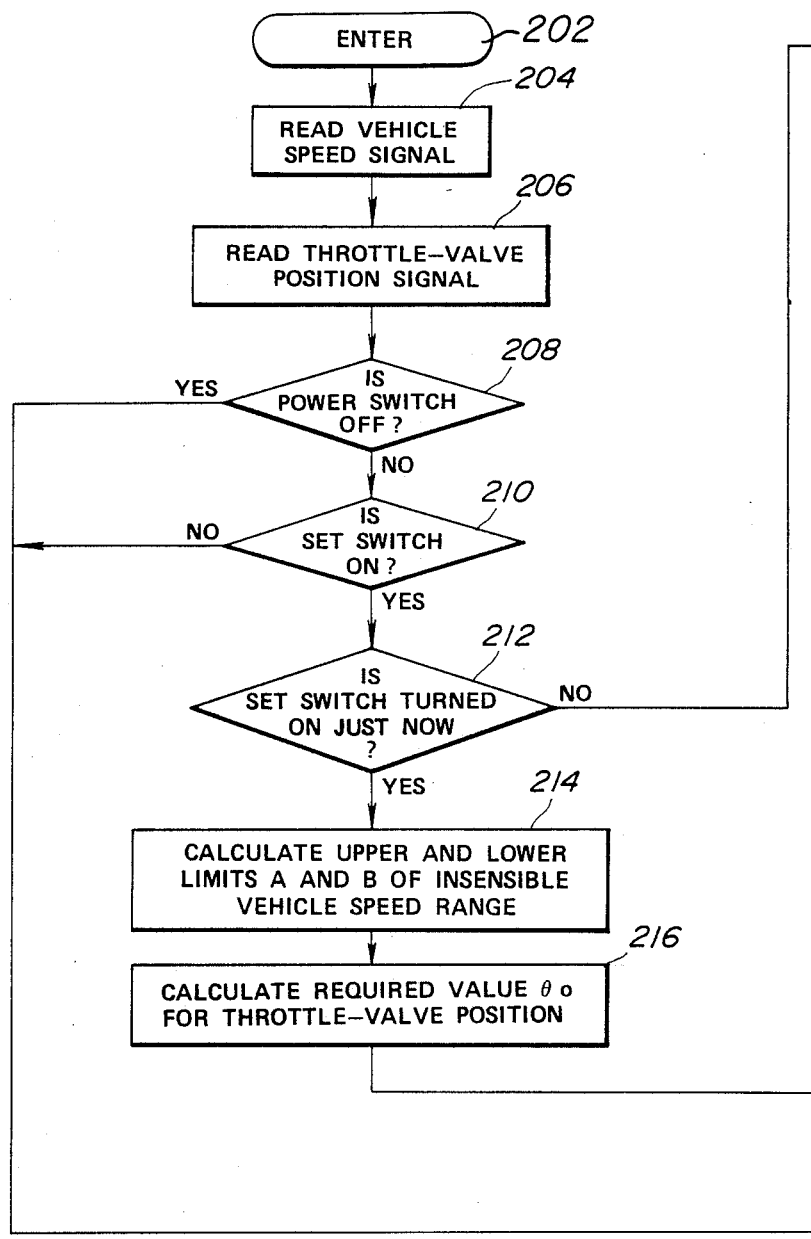
FIGS. 4A and 4B are flow diagrams of the programming of the digital computer.
Figure 4B:
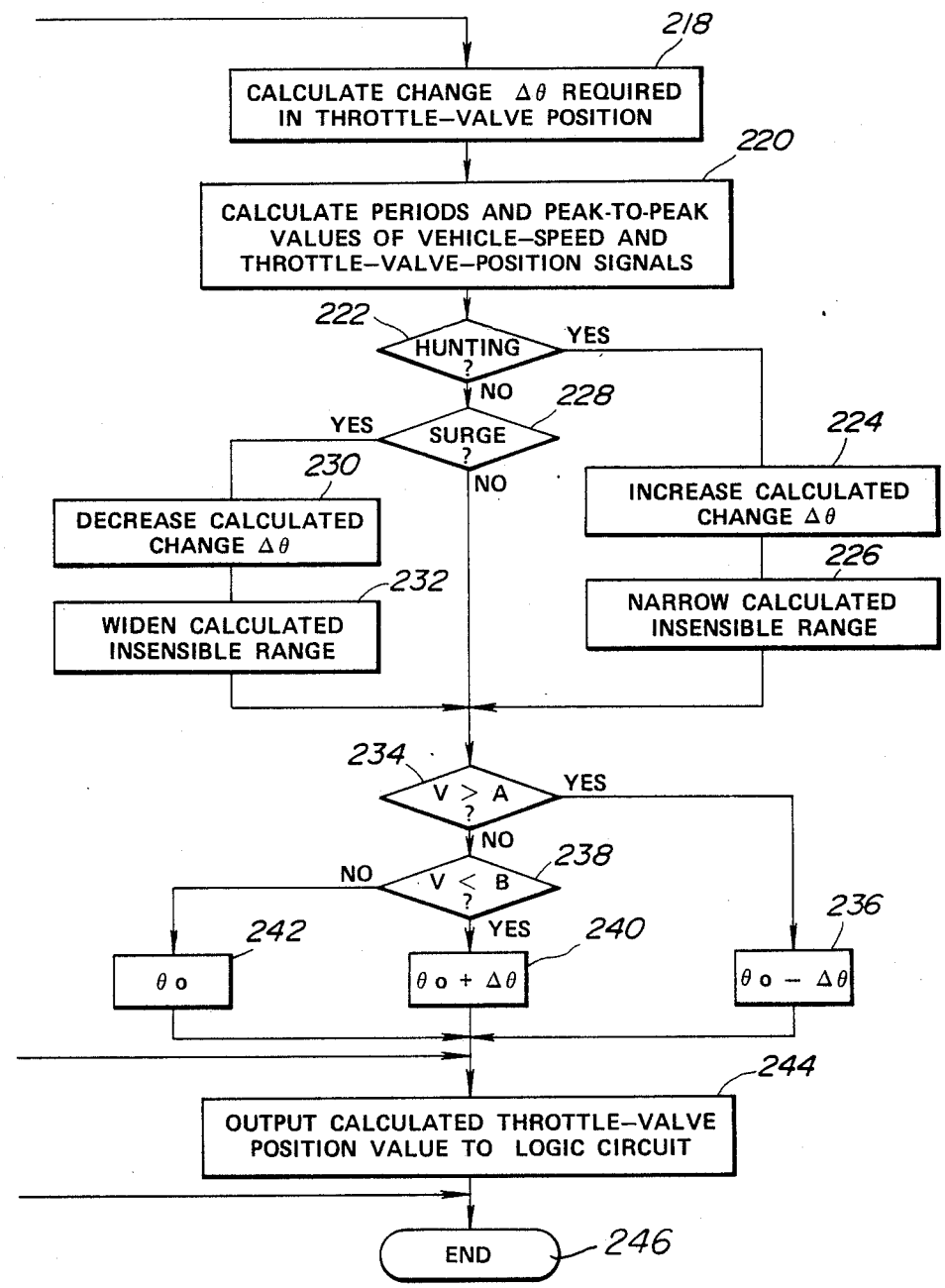

FIG. 4 is a flow diagram of the programming of the digital computer. Although it is assumed, in connection with FIG. 3, that the vehicle speed be controlled to a value existing at the time when the set switch 14 is turned on, it is to be appreciated that the invention is not limited in any way to such a case. The computer program is entered at the point 202 at constant time intervals. Following this, the inputs to the analog-to-digital converter are, one by one, converted into digital form and read into the computer memory. Thus, at the point 204 in the program, the vehicle speed signal is converted to digital form and read into the computer memory. Similarly, at the point 206 in the program, the throttle-valve position signal is converted to digital form and read into the computer memory.

At the point 208 in the program, a determination is made as to whether or not the power switch is off. If the answer to this question is "yes", then the program proceeds to the end point 246. Otherwise, the program proceeds to another determination point 210. This determination is as to whether or not the set switch 14 is turned on to produce a control signal. If the answer to this question is "no", then the program proceeds to the end point 246. Otherwise, the program proceeds to the point 212 where a determination is made as to whether or not the set switch 14 is turned on just now. If the answer to this question is "yes", then program proceeds to the point 214.

At the point 214, the central processing unit calculates the upper and lower limits A and B defining a vehicle speed insensible range around the vehicle speed value read at the point 204. The calculated upper and lower limit values A and B are stored in the computer memory. At the point 216 in the program, the central processing unit calculates a target value $\theta$o corresponding to a setting of the throttle valve position. In this case, the target throttle-valve position $\theta$o is set at a value read at the point 206. The calculated target value $\theta$o is stored in the computer memory. Following this, the program proceeds to the point 244 where the calculated setting value $\theta$o is transferred to the logic circuit 20.

If the answer to the question inputted at the point 212 is "no", then the program proceeds to the point 218 where a required throttle-valve position change $\Delta\theta$ is calculated by the central processing unit. The required change $\Delta\theta$ may be a predetermined value. Following this, the program proceeds to the point 220 where the central processing unit calculates the period and peak-to-peak value of the vehicle speed signal and the period and peak-to-peak value of the throttle-valve position signal in such a manner as described previously.

At the point 222 in the program, a determination is made as to whether or not hunting occurs. The answer to this question is "yes" only when the period of the vehicle speed signal is within a predetermined range, the peak-to-peak value of the vehicle speed signal is greater than a predetermined value, the period of the throttle-valve position signal is within a predetermined range, and the peak-to-peak value of the throttle-valve position signal is greater than a predetermined value, and the program proceeds to the point 224 where the central processing unit modifies the calculated change $\Delta\theta$ to a greater value. At the point 226 in the program, the central processing unit narrows the calculated vehicle speed insensible range by decreasing the upper limit A and increasing the lower limit B. Following this, the program proceeds to the point 234.

If the answer to the question inputted at the point 222 is "no", then the program proceeds to another determination step at the point 228. This determination is as to whether or not surge occurs. The answer to this question is "yes" only when the period of the throttle-valve position signal is less than a predetermined value and the peak-to-peak value of the throttle-valve position signal is greater than a predetermined value, and the program proceeds to the point 230 where the central processing unit modifies the calculated change $\Delta\theta$ to a smaller value. At the point 232 in the program, the central processing unit widens the calculated vehicle speed insensible range by increasing the upper limit A and decreasing the lower limit B. Following this, the program proceeds to the point 234.

If the answer to the question inputted at the point 228 is "no", then the program proceeds directly to the point 234 where a determination is made as to whether or not the vehicle speed value, which has been read at the point 204, is greater than the calculated upper limit A of the vehicle speed insensible range. If the answer to this question is "yes", then the program proceeds to the point 236 where the central processing unit modifies the throttle-valve position target value $\theta o$ to a smaller value by subtracting the calculated change $\Delta\theta$ from the calculated target value $\theta o$ and then the modified target value is transferred to the logic circuit at the point 244. The logic circuit sets the throttle valve position by producing pulses to the servo valve 22 so as to move the throttle valve 26 in a closing direction. As a result, the vehicle speed decreases toward the insensible range.

If the answer to the question inputted at the point 234 is "no", then the program proceeds to answer determination point 238. This determination is as to whether or not the vehicle speed value, which has been read at the point 204, is smaller than the calculated lower limit B of the vehicle speed insensible range. If the answer to this question is "yes", then the program proceeds to the point 240 where the central processing unit modifies the calculated throttle-valve position target value $\theta o$ to a greater value by adding the calculated change $\Delta\theta$ to the calculated target value $\theta o$ and then to the point 244 where the modified target value is transferred to the logic circuit. The logic circuit sets the throttle valve position by producing pulses to the servo valve 22 so as to move the throttle valve 26 in an opening direction. As a result, the vehicle speed increases toward the insensible range.

If the answer to the question inputted at the point 238 is "no", then it means that the vehicle speed is within the insensible range and the program proceeds to the point 242 where the calculated throttle-valve position target value $\theta o$ is retained as it stands. Following this, the rogram proceeds to the point 244 where the calculated target value is transferred to the logic circuit. The logic circuit sets the servo valve 22 in a manner to retain the throttle valve position. As a result, the vehicle speed is held within the insensible range.

It is apparent from the foregoing that the vehicle speed control apparatus of the invention can provide good vehicle constant-speed control free from hunting and/or surge problems which may occur when the automotive vehicle is running on an uphill or downhill road. In addition, the vehicle constant-speed control is equally applicable without any modification to various types of automotive vehicle different in response speed, engine performance, aerodynamic efficiency, and other characteristics.

While this invention has been described in conjunction with a specific embodiment thereof, it is evidence that many alternatives, modifications and variations will be apparent to those skilled in the art. Accordingly, it is intended to embrace all alternatives, modifications and variations that fall within the cope of the appended claims.

What is claimed is:

1. An apparatus for controlling a throttle valve to retain the speed of running of an automotive vehicle within an insensible range having a predetermined width defined by upper and lower limits, comprising:
   first sensor means sensitive to vehicle speed for providing a vehicle speed signal indicative of the sensed speed of running of the vehicle;
   second sensor means sensitive to throttle valve position for providing a throttle-valve position signal indicative of the sensed position of said throttle valve; and
   a control unit coupled to said first and second sensor means for moving said throttle valve a predetermined degree in a closing direction in response to the sensed vehicle speed greater than the upper limit and for moving said throttle valve the predetermined degree in an opening direction in response to the sensed vehicle speed less than the lower limit;
   said control unit including means for increasing said predetermined degree and narrowing said predetermined width of said insensible range when the vehicle speed signal has a period within a predetermined range and said vehicle speed signal has a peak-to-peak value greater than a predetermined value and when said throttle-valve position signal has a period within a predetermined range and the throttle-valve position signal has a peak-to-peak value greater than a predetermined value, whereby hunting is prevented.

2. The apparatus as claimed in claim 1, wherein said control unit includes means for decreasing said predetermined degree and widening said predetermined width of said insensible range when the throttle-valve position signal has a period less than a predetermined value and the throttle-valve position signal has a peak-to-peak value greater than a predetermined value, whereby surge is prevented.

3. An apparatus for controlling a throttle valve to retain the speed of running of an automotive vehicle within an insensible range having a predetermined width defined by upper and lower limits, comprising:
   first sensor means sensitive to vehicle speed for providing a vehicle speed signal indicative of the sensed speed of running of the vehicle;
   second sensor means sensitive to throttle valve position for providing a throttle-valve position signal indicative of the sensed position of said throttle valve; and
   a control unit coupled to said first and second sensor means for moving said throttle valve a predetermined degree in a closing direction when the sensed vehicle speed is greater than the upper limit and for moving said throttle valve by the predetermined degree in an opening direction when said sensed vehicle speed is less than the lower limit;
   said control unit including means for decreasing said predetermined degree and widening said predetermined width of said insensible range when said throttle-valve position signal has a period less than a predetermined value and the throttle-valve position signal has a peak-to-peak value greater than a predetermined value, whereby surge is prevented.

4. An apparatus for controlling a throttle valve to retain the speed of running of an automotive vehicle within an insensible range having a predetermined width defined by upper and lower limits, comprising:

first sensor means sensitive to vehicle speed for providing a vehicle speed signal indicative of the sensed speed of running of the vehicle;

second sensor means sensitive to said throttle valve position for providing a throttle-valve position signal indicative of the sensed position of said throttle valve; and a control unit coupled to said first and second sensor means for moving said throttle valve a predetermined degree, repetitively at uniform time intervals, in an opening direction when the sensed vehicle speed is less than the lower limit and in closing direction when the sensed vehicle speed exceeds the upper limit, said control unit including means for calculating a period of said vehicle speed signal, means for calculating a peak-to-peak value of the vehicle speed signal, means for calculating a period of said throttle-valve position signal, means for calculating a peak-to-peak value of said throttle-valve position signal, means for providing a first control signal when said calculated period of said vehicle speed signal is within a predetermined range, when said calculated peak-to-peak value of the vehicle speed signal is greater than a predetermined value, when said calculated period of said throttle-valve position signal is within a predetermined range, and when said calculated peak-to-peak value of said throttle-valve position signal is greater than a predetermined value, and means responsive to said first control signal for increasing said predetermined degree and narrowing said predetermined width of the insensible range, whereby hunting is prevented.

5. The apparatus as claimed in claim 4, wherein said control unit includes means for providing a second control signal when the calculated period of said throttle-valve position signal is less than a predetermined value and when the calculated peak-to-peak value of said throttle-valve position signal is greater than a predetermined value, and means responsive to said second control signal for decreasing the predetermined degree and widening the predetermined width of the insensible range, whereby surge is prevented.

6. An apparatus for controlling a throttle valve to retain the speed of running of an automotive vehicle within an insensible range having a predetermined width defined by upper lower limits, comprising:

first sensor means sensitive to vehicle speed for providing a vehicle speed signal indicative of the sensed speed of running of the vehicle;

second sensor means sensitive to said throttle valve position for providing a throttle-valve position signal indicative of the sensed position of said throttle valve; and a control unit coupled to said first and said second sensor means for moving said throttle valve a predetermined degree, repetitively at uniform time intervals, in an opening direction when the sensed vehicle speed is less than the lower limit and in a closing direction when the sensed vehicle speed exceeds the upper limit, said control unit including means for calculating a period of said throttle-valve position signal, means for calculating a peak-to-peak value of said throttle-valve position signal, means for providing a control signal when said calculated period of the throttle-valve position signal is less than a predetermined value and when said calculated peak-to-peak value of said throttle-valve position signal is greater than a predetermined value, and means responsive to said control signal for decreasing the predetermined degree and widening the predetermined width of the insensible range, whereby surge is prevented.

* * * * *